UNITED STATES PATENT OFFICE.

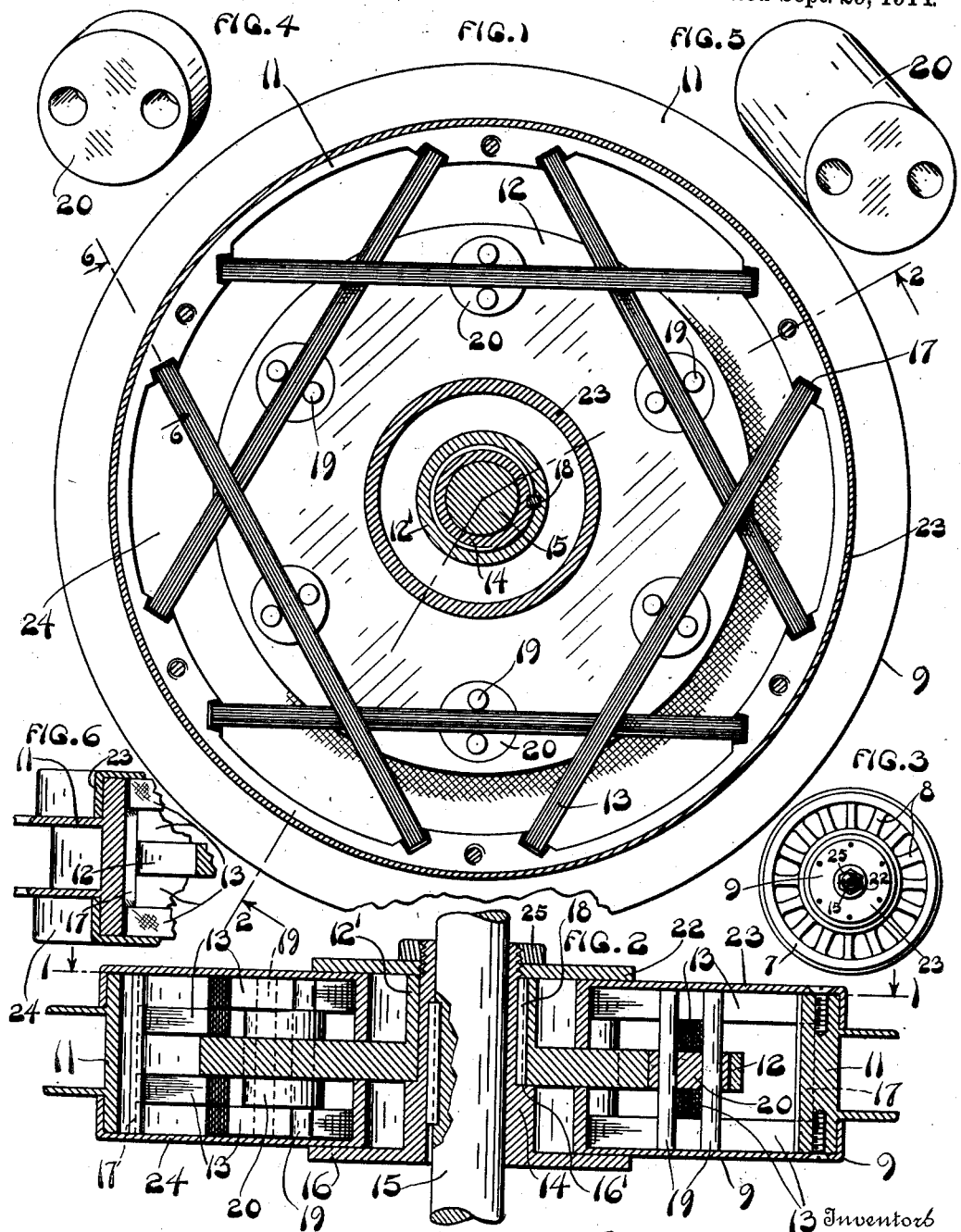

FREDERICK M. ROSS AND HORACE G. HORSTMAN, OF CINCINNATI, OHIO, ASSIGNORS OF ONE-FOURTH TO WILLARD W. BAXTER AND ONE-FOURTH TO THEODORE HORSTMAN, BOTH OF CINCINNATI, OHIO.

SPRING-WHEEL.

1,111,863.   Specification of Letters Patent.   Patented Sept. 29, 1914.

Application filed January 27, 1913. Serial No. 744,299.

*To all whom it may concern:*

Be it known that we, FREDERICK M. ROSS and HORACE G. HORSTMAN, citizens of the United States of America, and residents of Cincinnati, county of Hamilton, and State of Ohio, have invented certain new and useful Improvements in Spring-Wheels, of which the following is a specification.

This invention relates to improvements in vehicle wheels, and particularly to that class commonly used for self-propelled vehicles, in which a more or less yielding radial motion of the wheel, with reference to its axis, is desirable for the purpose of relieving the vehicle of much of the incidental shock and vibration to which the wheel is subjected in passing over uneven paving or obstructions.

An object of the invention is to produce a wheel, more simple in construction and more effective in operation than those now in use or known to us, and one in which the relatively movable members, employed for the purpose of producing the desired radial resiliency of the wheel, are located near the center of the wheel.

A further object is to produce a resilient wheel in which improved means are employed for engaging and for increasing the resiliency of the springs, located between the relatively movable members of the wheel.

These and other objects we attain in a wheel embodying the features herein described, and illustrated in the drawings accompanying and forming a part of this application.

In the drawings Figure 1 is a vertical sectional view, along the line 1—1 of Fig. 2, of the hub portion of a wheel embodying our invention. Fig. 2 is a transverse sectional view, along the broken line 2—2 of Fig. 1. Fig. 3 is a side elevation, on a greatly reduced scale, of a wheel embodying our invention. Figs. 4 and 5 are perspective views, on an enlarged scale, of spools which form details of our invention. Fig. 6 is a fragmentary sectional view, along the line 6—6 of Fig. 1, and illustrates the construction of the spring engaging slots with which the rim is provided.

The wheel illustrated as an embodiment of our invention comprises a felly 7, which may be of the usual construction, spokes 8, of any suitable form and a hub portion 9, which, as illustrated, includes an annular rim 11, a disk or central member 12, and a plurality of sets of springs 13, which are located between the rim and the disk 12 and operate to yieldingly support the disk, on the rim, and to yieldingly hold it in a concentric position, with relation to the rim. The disk 12 is annular in form and its inner edge is provided with an annular flange 12', which extends at right angles to the disk and is mounted on a cylindrical sleeve 14, which forms, in effect, the hub proper of the wheel, and is shown in the drawings, keyed to an axle 15. It will be understood, however, that the sleeve 14 may be rotatably mounted on the axle instead of being rigidly secured thereto, and that wheels embodying our invention are adapted to be used either as steering or the driving wheels of vehicles. The sleeve 14 is provided at one end with an integrally formed plate 16, and it is provided at an intermediate point with a shoulder 16', against which the disk 12 abuts, when it is in place on the sleeve. The disk 12 is adapted to be rigidly secured to the sleeve 14 by any suitable means, such for example, as the key 18, which is located in suitable key-ways, formed in the sleeve 12' and in the sleeve 14, and which positively prevents the disk from turning relatively to the sleeve 14.

In the wheel illustrated, each set of springs includes a plurality of flat springs which are of substantially the same length and width, and are arranged side by side, so that they form, in effect, a leaf spring in which the separate springs are not permanently secured together, and are therefore capable of moving, relatively to each other, when subjected to deflecting strains. Each set of springs is loosely mounted on the rim 11 with its ends inserted into slots 17, which extend transversely across the rim, as shown in Fig. 6. Each slot 17, is provided with inclined walls which converge toward the inner face of the slot. This is for the purpose of insuring a free deflection of the springs, and of preventing the ends of the springs from binding or from being gripped by the edges of the slots 17, when the springs are under strain. The disk 12 is supported on the springs through the agency of pins 19, which are loosely mounted on spools 20, carried by the disk, and which engage the springs at intermediate points, substantially midway between their ends. The spools are rotatably mounted in apertures which extend transversely through the disk 12, and each spool is provided with two of the pins 19, which project beyond each end of the spool, and are adapted to engage two sets of springs, one of which is located on one side, and the other, on the other side, of the disk 12. The pins 19 of each pair are spaced apart, a distance substantially equal to the width of the sets of springs which they engage, and one pin is located on each side of the set of springs engaged. The sets of springs are arranged in two groups, one being located on one side, and the other on the other side of the disk 12. As illustrated, each set of springs of each group is so mounted on the rim 11, that it is crossed by two adjacent sets of springs. With this arrangement every other set of springs, of each group, contacts with, or rests against the adjacent surface of the disk 12: and the spools 20, coöperating with these sets of springs, are equal in length to the thickness of the disk. The sets of springs of each group are similarly arranged, with respect to the disk 12, and consequently, the spools, which are equal in length to the thickness of the disk (see Fig. 4), are held in place, on the disk, by the coöperation of two sets of springs located on opposite sides of, and engaging the disk. The intermediate sets of springs, that is, those which cross the springs resting against the disk, are supported by the two sets of springs which they cross, and consequently, are spaced from the disk 12 a distance equal to the width of their supporting springs. The spools 20, (see Fig. 5) which coöperate with these intermediate sets of springs, are longer than the spools previously referred to, and project, on each side of the disk, into engagement with their coöperating sets of springs. This forms an intermediate support for each intermediate set of springs, and each spool is held in place on the disk by the coöperation of the oppositely located sets of springs, with which it contacts.

The springs, the major portion of the rim 11, and the disk 12, are inclosed by a casing, which is shown as formed of two annular shells 23 and 24, each of which is flanged at its inner and outer edges, so as to engage the disk 12 and the rim 11, respectively. The outer edge of each shell is secured to the rim by any suitable means, such for example as screws, while the inner edge is held, in sliding engagement with the disk 12, by the coöperation of the plate 16, formed on the sleeve 14, and a plate 22, which, as shown, is screwed onto the end of the sleeve 14 and is held in place by means of a check nut 25. While it is desirable to hold the inner flanges of the shells, against the disk 12, with sufficient pressure to prevent oil from being discharged from the casing, and dirt and grit from being admitted into the casing—the shells are so pressed against the disk that their inner flanges will readily slide across the disk 12, to accommodate variations in the relative positions of the rim and the disk.

One of the features of our invention is the simplicity of construction and the ease with which the separate parts can be assembled, or taken apart. In assembling the hub portion, the sleeve 14 is preferably placed in a vertical position, so that its integrally formed plate 16 forms a base on which it rests. The shell 24 is then placed in position on the plate 16, so that it is substantially concentric with the sleeve 14. The rim 11 is then inserted within the outer flanges of the shell 24, and if desired, it may at that time be secured to the shell 24. It will be understood that the felly and the spokes may be secured to the rim, if desired. The springs 13 of one group are then located in their proper relative positions, on the shell 24, with their ends in the slots 17, provided in the rim 11. This can be readily accomplished, since the slots 17 extend clear across the inner face of the rim. The central element or disk 12 is then placed on the hub 14, so that it engages the shoulder 16'. The spools 20 are then inserted or dropped into the apertures provided in the disk, so that each spool rests on one of the sets of springs below the disk. The pins 19 are then inserted through the apertures, formed in the spools, so that each pair of pins engages the set of the springs engaged by its mounting spool. The sets of springs comprising the group above the plate, are then located in place by inserting their ends into the slots 17 in the rim, and by locating the intermediate portions, of the springs of each set, between one pair of pins 19. The shell 23 is then fitted to place with its outer flange in engagement with the rim 11, and with its inner flange in contact with the disk 12. The key 18 is then driven home, for the purpose of securing the disk to the hub 14 and for preventing it from rotating relatively thereto, and the inner edges of the inclosing shells are then secured in place by screwing the plate 22 onto the threaded end of the hub 14. This also forces the disk 12 against the shoulder 16' on the hub, since the end of the flange 12' is engaged by the plate 22. After the plate 22 is in place, the check nut 25 is screwed onto the hub 14 and the outer edge of the shell 23 is secured to the rim 11. When the casing, or the shells 23 and 24, are in place all of the parts of the hub portion are positively held in position. The pins 19 are all of the same length, and each is of such length that it is engaged, and held in place by both shells 23 and 24. The width of the springs, included in the separate sets, are so proportioned, with relation to the thickness of the disk 12 and the width of the rim 11, that the outer sets of springs are engaged by the shells, when the shells are in place, and they, in turn, operate to hold the inner sets of springs in engagement with the disk 12. This positively holds each of the separate parts of the hub portion in the proper position with relation to the other parts, but it does not prevent a free deflection of the springs or a free relative movement between the disk 12 and rim 11.

When it is necessary to have access into the casing, for the purpose of removing any of the springs or parts inclosed within the casing, all that is necessary is to remove the plate 22 and the shell 23. If this does not give access to the desired set of springs, or the desired parts, the disk 12 may then be removed.

It will be understood that any desired number of sets of springs may be employed in each group, and that they may be arranged in various positions with relation to each other. We preferably employ six sets of springs in each group, and so locate them that each set crosses two adjacent sets and is inclined at an angle of substantially 60 degrees to each of the adjacent sets. In other words, the sets of springs of each group are arranged hexagonally, with relation to each other, with the ends of each set of springs crossing the ends of adjacent sets.

When the entire wheel is assembled and the spokes are secured in place between the rim 11 and the felly 7, and the wheel is supported in the usual position, the disk 12 is supported on the rim 11 by the springs 13 and the weight of the axle is transmitted to the spokes of the wheel, through the agency of the pins 19, the springs 13, and the rim 11. The result is that the pressure between the springs and the pins is exerted on the springs at a point to produce the maximum deflection of the springs and consequently the maximum resiliency of the wheel. No matter in what position the wheel is located, at least two sets of springs of each group receive the major portion of the weight borne by the wheel and are subjected to the maximum deflection. Each set of springs, moreover, coöperates with every other set and bears a proportionate part of the load. The spools 20 are, however, provided for the purpose of preventing the pins 19 from binding or gripping the sets of springs, with which they coöperate, and of thereby impairing the resiliency of the wheel. This is accomplished by rotatably mounting the spools on the disk 12, so that they are capable of turning in response to forces transmitted to them, by the pins 19, and of thereby accommodating their positions to the varying positions of the springs.

This permits the springs of one set to slide relatively to their engaging pins, when other sets of springs are subjected to maximum distortion. Under such conditions the springs of each set are free to deflect, and springs not directly subjected to a crossbending strain are prevented from limiting the deflection of springs subjected to cross-bending strains. The sudden shocks and jars to which the wheels are ordinarily subject in traversing a road or street, will therefore, be almost wholly taken up by the springs 13, and will not be imparted to the vehicle.

The wheel illustrated is well adapted for use as the driving wheel of a self-propelled vehicle, since the springs will respond to extraordinary torsional strains, to which the driving wheels are sometimes subjected; and consequently, the felly will, under such conditions, lag behind the disk 12 or the hub 14 of the wheel. In other words, with the springs arranged as illustrated, the vehicle in which they are employed will be relieved of the sudden jerks resulting from a sudden starting of the engine, or a sudden application of the brakes, since the tendency of the disk 12 to move circumferentially, with relation to the rim 11, will cause each set of pins to subject its corresponding springs to a deflecting force, and the point of application of the force will be located at the point of maximum deflection of each set of springs. It is however to be noticed that the strains resulting from torsional forces within the wheel are borne equally by all of the springs, and that therefore, the felly of the wheel will not tend to lag, or move circumferentially of the disk 12, when the wheel is subjected to the usual torsional strains. The fact that the spools 20 are rotatively mounted on the disk 12, permits the pins 19 to equally distribute the torsional forces on all of the sets of springs employed, and therefore improves the operation of the wheel.

In accordance with the United States patent statutes, we have illustrated and described what we now believe to be the preferred embodiment of our invention, and we desire it to be understood that various changes, modifications and substitutions may be made in the device illustrated, without departing from the spirit and scope of our invention as set forth by the appended claims.

What we claim is:

1. In combination with a rim, a disk surrounded by, but spaced from the rim, a plurality of sets of straight flat springs, mounted on said rim, each set of springs being engaged by the rim at its ends only, and pin-carrying spools mounted on the disk, for supporting the disk on the springs.

2. In combination with an annular rim, a disk concentric with, but spaced from said rim, a plurality of sets of springs mounted on said rim, spools rotatably mounted on the disk and pins carried by the spools for engaging each set of springs at intermediate points.

3. In combination with a substantially annular rim, a disk, surrounded by, but spaced from the rim, a plurality of springs, each spring having both its ends supported on said rim, and separate means, movably mounted on said disk, for engaging each spring at a point intermediate its ends.

4. In combination in a wheel, a hub portion comprising a substantially annular rim, a disk surrounded by, but radially spaced from said rim, a plurality of springs, each spring having both its ends supported on the rim, spools rotatably mounted on said disk, and pins, carried by each spool, for engaging one of said springs.

5. In combination with a substantially annular rim, a disk surrounded by, but spaced from said rim, a plurality of springs, each spring having its ends only, supported by the rim, spools rotatably mounted on said disk, and a pair of pins loosely mounted on each spool, for slidably engaging each spring at a point between its ends.

6. In a resilient wheel, a hub portion comprising an annular rim, an axle-engaging sleeve having a plate integrally formed at one end thereof, a substantially annular disk surrounded by the rim, but radially spaced therefrom, and having an annular flange formed at the inner edge thereof, said disk being mounted on said sleeve, a set of springs located on each side of said disk, with the ends of each set loosely engaged by slots formed in the rim, means mounted on the disk for engaging each set of springs at a point intermediate its ends and a substantially annular casing secured at its outer edge to said rim, for holding said springs in position relatively to said rim and said disk, and a plate secured to said sleeve, and coöperating with said integrally formed plate for clamping the inner edges of said casing, against said disk.

7. In a resilient wheel, a hub portion comprising an annular rim, having a plurality of transversely extending slots formed across the inner face thereof, an axle-engaging sleeve, having an integrally formed plate located at one end thereof, a substantially annular disk having an annular flange formed at the inner edge thereof and mounted on said sleeve, a group of springs located on each side of said disk, each spring having its ends loosely engaged by two of the slots formed in the rim, means movably mounted on the disk, for loosely engaging the springs at points intermediate their ends, a casing formed of two coöperating, substantially annular shells, for holding said springs in position relatively to the rim and the disk, and means coöperating with said integrally flanged plate, for clamping each shell against said disk.

8. In a resilient wheel, a hub portion comprising, an annular rim, an axle-engaging sleeve having an integrally formed plate located at one end thereof, an annular disk having an annular flange formed at the inner edge thereof and mounted on the sleeve, a plurality of sets of springs located on each side of said disk, with the ends of each set loosely engaged by transversely extending slots, formed across the inner face of the rim, spools rotatably mounted on the disk, pins loosely mounted on the spools for engaging said springs at points between their ends, a casing for holding said springs, said pins and said spools, in their proper relative positions, and comprising two substantially annular shells secured at their outer edges to said rim, and means coöperating with said integrally formed plate, for clamping the inner edges of said shells against said disk.

9. In combination in a wheel, a hub portion, comprising a sleeve having an integrally formed plate located at one end and threaded at the other end, an annular disk having a flange around its inner edge and capable of being moved to position on said sleeve, over the threaded end of the sleeve, spools loosely engaged by the disk, pins loosely engaged by the spools, a rim surrounding the disk, a plurality of sets of springs loosely mounted on said rim and engaged at intermediate points by said pins, a casing engaging the rim and the disk and holding the springs, the pins and the spools in their proper relative position, and a plate screwed onto the threaded end of the sleeve for coöperating with the plate integrally formed on the sleeve in holding the disk in place on the sleeve and the inner edges of the casing in place relatively to the disk.

10. In combination with a substantially annular rim, a plurality of sets of flat bar springs mounted on the rim in segmental relation thereto and with their ends only engaged thereby, pin-carrying means rotatably mounted on said central member, with the pins of each means engaging a set of springs at a point intermediate its ends and capable of moving longitudinally, relatively to the set engaged thereby.

In testimony whereof, we have hereunto subscribed our names this 24th day of January, 1913.

FREDERICK M. ROSS.
HORACE G. HORSTMAN.

Witnesses:
E. W. McCallister,
W. Thornton Bogert.